(12) United States Patent
Kato et al.

(10) Patent No.: US 10,300,755 B2
(45) Date of Patent: May 28, 2019

(54) SUSPENSION DEVICE FOR NON-STEERED DRIVING WHEEL INCORPORATING IN-WHEEL MOTOR

(71) Applicant: TOYOTA JIDOSHA KABUSHIKI KAISHA, Toyota-shi, Aichi (JP)

(72) Inventors: Yoshihisa Kato, Miyoshi (JP); Satoshi Adachi, Nagoya (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 15/980,109

(22) Filed: May 15, 2018

(65) Prior Publication Data

US 2018/0334002 A1    Nov. 22, 2018

(30) Foreign Application Priority Data

May 16, 2017    (JP) .................................. 2017-097127

(51) Int. Cl.
*B60G 3/20* (2006.01)
*B60K 7/00* (2006.01)
(Continued)

(52) U.S. Cl.
CPC ................. *B60G 3/20* (2013.01); *B60G 3/14* (2013.01); *B60G 7/008* (2013.01); *B60K 7/0007* (2013.01); *B62K 5/10* (2013.01); *B62K 25/20* (2013.01); *B62M 7/12* (2013.01); *B60G 2200/132* (2013.01); *B60G 2200/446* (2013.01); *B60G 2202/42* (2013.01); *B60G 2204/148* (2013.01); *B60G 2204/1482* (2013.01); *B60G 2204/182* (2013.01); *B60G 2204/40* (2013.01); *B60G 2204/41* (2013.01); *B60G 2204/422* (2013.01); *B60G 2206/012* (2013.01); *B60G 2206/16* (2013.01); *B60G 2300/122* (2013.01);
(Continued)

(58) Field of Classification Search
CPC .............. B60G 3/20; B60G 2204/1482; B60G 2204/41; B60K 7/00; B60K 7/0007; B62K 5/10; B62K 2005/001
See application file for complete search history.

(56) References Cited

U.S. PATENT DOCUMENTS 3,831,967 A * 8/1974 Uhlenhaut ............... B60G 3/20
                                                267/221
4,798,396 A * 1/1989 Minakawa ............... B60G 3/26
                                                280/124.138
(Continued)

FOREIGN PATENT DOCUMENTS

JP        2005-126037 A      5/2005

*Primary Examiner* — Frank B Vanaman
(74) *Attorney, Agent, or Firm* — Sughrue Mion, PLLC

(57) ABSTRACT

A suspension device for a non-steered driving wheel including a wheel carrier having an in-wheel motor incorporated therein for driving the driving wheel, and a suspension arm pivotally supported on a vehicle body and connected to the wheel carrier by a connecting structure. The connecting structure includes a plate member fixed to the wheel carrier by fastening and a pair of elastic bushing devices attached to the plate member. The suspension arm has an open cross sectional portions for receiving portions of the plate member and the elastic bushing devices, and the elastic bushing devices are fixed to the open cross sectional portions at both ends.

6 Claims, 6 Drawing Sheets

(51) Int. Cl.
  *B62K 5/10* (2013.01)
  *B60G 3/14* (2006.01)
  *B60G 7/00* (2006.01)
  *B62K 25/20* (2006.01)
  *B62M 7/12* (2006.01)
  *B62K 5/00* (2013.01)

(52) U.S. Cl.
  CPC ...... *B60G 2300/45* (2013.01); *B60G 2300/50* (2013.01); *B60K 2007/0038* (2013.01); *B60K 2007/0092* (2013.01); *B62K 2005/001* (2013.01)

(56) References Cited

U.S. PATENT DOCUMENTS

| | | | | |
|---|---|---|---|---|
| 5,284,353 | A * | 2/1994 | Shinji | B60G 3/20 280/124.136 |
| 2004/0080223 | A1* | 4/2004 | Shimizu | B60K 7/0007 310/75 C |
| 2007/0068715 | A1* | 3/2007 | Mizutani | B60G 3/20 180/65.51 |
| 2008/0093133 | A1* | 4/2008 | Yogo | B60G 3/20 180/55 |
| 2011/0174560 | A1* | 7/2011 | Osawa | B60K 7/0007 180/65.51 |
| 2016/0059923 | A1* | 3/2016 | Simon | B60G 21/055 280/62 |

* cited by examiner

SUSPENSION DEVICE FOR NON-STEERED DRIVING WHEEL INCORPORATING IN-WHEEL MOTOR

CROSS-REFERENCE TO RELATED APPLICATION

The disclosure of Japanese Patent Application NO. JP2017-97127 filed on May 16, 2017 is incorporated by reference in its entirety.

BACKGROUND

1. Technical Field

The present disclosure relates to a suspension device, and more particularly to a suspension device for a non-steered driving wheel incorporating an in-wheel motor.

2. Description of the Related Art

In a vehicle such as an electric vehicle having wheels that each incorporate an in-wheel motor, each in-wheel motor is housed in a housing and cooperates with the housing to form an in-wheel motor unit. A main part of the in-wheel motor unit is disposed radially inside a wheel member of the wheel together with a support member for rotatably supporting the wheel. A suspension device that suspends the wheel incorporating the in-wheel motor from a vehicle body includes a suspension arm that is pivotally supported on the vehicle body at one end so that the wheel can move up and down with respect to the vehicle body like a suspension device for a wheel not incorporating an in-wheel motor and is connected to the in-wheel motor unit at the other end.

In a wheel incorporating an in-wheel motor, in addition to a vibration of the wheel caused by a road surface input, vibration caused by the rotation of the in-wheel motor is generated. Therefore, an elastic vibration isolator device having a vibration shielding function, such as a rubber damper or a rubber bushing device, is interposed between one end of a suspension arm and an in-wheel motor unit so that the vibration of the wheel is transmitted to a vehicle body as little as possible.

For example, in Japanese Patent Application Laid-open No. 2005-126037, a suspension device is described in which a central portion of an arm member extending in a direction crossing a suspension arm is supported by one end of a suspension arm, and rubber mounts are interposed between both ends of the arm member. One end of each rubber mount is received in a recess provided in a housing of an in-wheel motor unit, and the other end of the rubber mount is connected to one end of the arm member.

In a case where a part of the vibration isolator device is arranged in a recess provided in the housing of the in-wheel motor unit as in the suspension device described in the above-mentioned Japanese Laid-open publication, a necessary number of recesses must be formed in the housing. The housing of the in-wheel motor unit has a size large enough to accommodate the in-wheel motor, so it is large and heavy. Therefore, it is not easy to form a plurality of recesses with high precision in the housing.

The above problem arises regardless of whether a wheel is a steered wheel or a non-steered wheel. In a case where a vibration isolator device is a rubber bushing device disposed between one end of a suspension arm and a housing of the in-wheel motor unit and supported by the housing, since the position of one end of the suspension arm with respect to the housing is determined by the rubber bushing device, the above problem is particularly noticeable.

SUMMARY

The present disclosure provides a suspension device for a non-steered driving wheel incorporating an in-wheel motor that is improved so that recesses for receiving parts of a rubber bushing devices which are elastic vibration isolator devices do not need to be formed in a housing of the in-wheel motor.

According to the present disclosure, a suspension device for a non-steered driving wheel is provided which is rotationally driven by an in-wheel motor incorporated in a wheel carrier, the suspension device comprising a suspension arm pivotally supported on a vehicle body of a vehicle and connected to the wheel carrier by a connecting structure.

The connecting structure includes a plate member fixed to the eel carrier by fastening at positions spaced in the front-rear direction of a vehicle, and a pair of elastic bushing devices attached to the plate member in a state of being inserted through the plate member at positions spaced in the front-rear direction of the vehicle; the suspension arm has open cross sectional portions which each receive a portion of the plate member and the elastic bushing device; and the elastic bushing devices are fixed to the open cross sectional portions at both ends.

According to the above configuration, the connecting structure includes a plate member and a pair of elastic bushing devices. The plate member is fastened to the wheel carrier at positions spaced in the front-rear direction of a vehicle by fastening, and the pair of elastic bushing devices are inserted into the plate member at positions spaced in the front-rear direction of the vehicle. In addition, the suspension arm has open cross sectional portions which each receive a part of the plate member and the elastic bushing device, and the elastic bushing devices are fixed to the open cross sectional portions at both ends.

Therefore, it is not necessary to form recesses for receiving parts of elastic bushing devices in the wheel carrier, and it is sufficient to simply provide holes or the like for fixing the plate member to the wheel carrier by fastening. Further, when fixing the plate member to the wheel carrier by fastening, the position of the elastic bushing device with respect to the wheel carrier can be adjusted by adjusting a position of the plate member with respect to the wheel carrier. Consequently, machining accuracy of holes or the like may not be as high as machining accuracy of recesses for receiving parts of the elastic vibration isolator devices. Therefore, as compared with the conventional suspension device in which recesses for receiving parts of the elastic vibration isolator devices are required to be formed on a wheel carrier with high accuracy, a machining necessary for connecting a suspension arm to a wheel carrier can be easily and efficiently performed.

Notably, if a pair of elastic bushing devices are attached to a plate member in advance, these members can be handled as one member. Therefore, by fixing the plate member to which a pair of elastic bushing devices are attached in advance to a wheel carrier, the plate member and the pair of elastic bushing devices can be attached to the wheel carrier at the same time. Thus, the work of connecting the wheel carrier and the suspension arm does not become excessively complicated.

In one aspect of the present disclosure, the plate member is fixed to the wheel carrier by a pair of fastening members, and the pair of fastening members are positioned between the pair of elastic bushing devices and are aligned with the pair of elastic bushing devices in the front-rear direction of the vehicle.

According to the above aspect, a pair of fastening members for fixing the plate member to the wheel carrier are positioned between the pair of elastic bushing devices and are aligned with the pair of elastic bushing devices in the longitudinal direction of the vehicle. Therefore, for example, in comparison with the case where the pair of elastic bushing devices are laterally offset with respect to the pair of fastening members, a longitudinal force can be efficiently transmitted between the wheel carrier and the suspension arm. Accordingly, in a situation where a longitudinal force acts between the wheel carrier and the suspension arm, it is possible to reduce a moment acting on the suspension arm and the plate member as viewed from above.

In another aspect of the present disclosure, the plate member is fixed to the wheel carrier by a pair of fastening members, and the pair of fastening members are offset in the lateral direction of the vehicle with respect to the pair of elastic bushing devices.

According to the above aspect, the pair of fastening members are offset in the lateral direction of the vehicle with respect to the pair of elastic bushing devices. Therefore, as compared with the case where the pair of fastening members are positioned between the pair of elastic bushing devices and are aligned with the pair of elastic bushing devices in the front-rear direction of the vehicle, the distance between the pair of elastic bushing devices can be reduced. Accordingly, it is possible to reduce the dimension in the front-rear direction of the end portion of the suspension arm on the side of the wheel carrier and to facilitate the placement of the end portion of the suspension arm and the wheel carrier in a predetermined space of the wheel.

In another aspect of the present disclosure, the plate member has a central portion fixed to the wheel carrier by a pair of fastening members and two end portions to which the elastic bushing devices are attached, and the two end portions are vertically offset with respect to the central portion.

According to the above aspect, since the two end portions of the plate member are vertically offset with respect to the central portion, the degree of freedom of setting the vertical positional relationship of the wheel carrier and the end portion of the suspension arm can be increased. In particular, when the two ends of the plate member are offset upwards with respect to the central portion, the distance in the vertical direction between an axis of rotation of the wheel and a center of a cross section of the end portion of the suspension arm on the side of the wheel carrier can be reduced. Accordingly, it is possible to reduce a bending moment acting on the suspension arm as seen in the lateral direction due to a longitudinal force acting between the wheel carrier and the suspension arm, as compared with the case where the plate member is a flat plate.

In another aspect of the present disclosure, the vehicle includes a pair of the non-steered driving wheels spaced laterally and a vehicle tilting device configured to tilt the vehicle to a turning inner side when the vehicle turns, and the vehicle tilting device includes a swing member that swings about a swing axis extending in the front-rear direction, an actuator that swings the swing member about the swing axis, and a pair of connecting rods pivotally connected to the swing member at upper end pivot points and pivotally connected to the corresponding wheel carriers at lower end pivot points on both lateral sides with respect to the swing axis.

According to the above aspect, the non-steered driving wheels suspended from the vehicle body by the suspension device are non-steered driving wheels of the automatic tilting vehicle which is tilted to a turning inner side when turning by the vehicle tilting device. The suspension device can allow the pair of non-steered driving wheels to move up and down in reverse phase when the vehicle is tilted to a turning inner side by vertically moving the pair of connecting rods in reverse phase.

Other objects, other features and attendant advantages of the present disclosure will be readily understood from the description of the embodiments of the present disclosure described with reference to the following drawings. It is to be noted that in the present application, "front-rear direction" or "longitudinal direction" and "lateral direction" are the front-rear direction of the vehicle and the lateral direction of the vehicle, respectively, and "front" and "rear" are front and rear in the front-rear direction of the vehicle, respectively.

DETAILED DESCRIPTION

The embodiments of the present disclosure will now be described in detail with reference to the accompanying drawings.

First Embodiment

Figure 1:
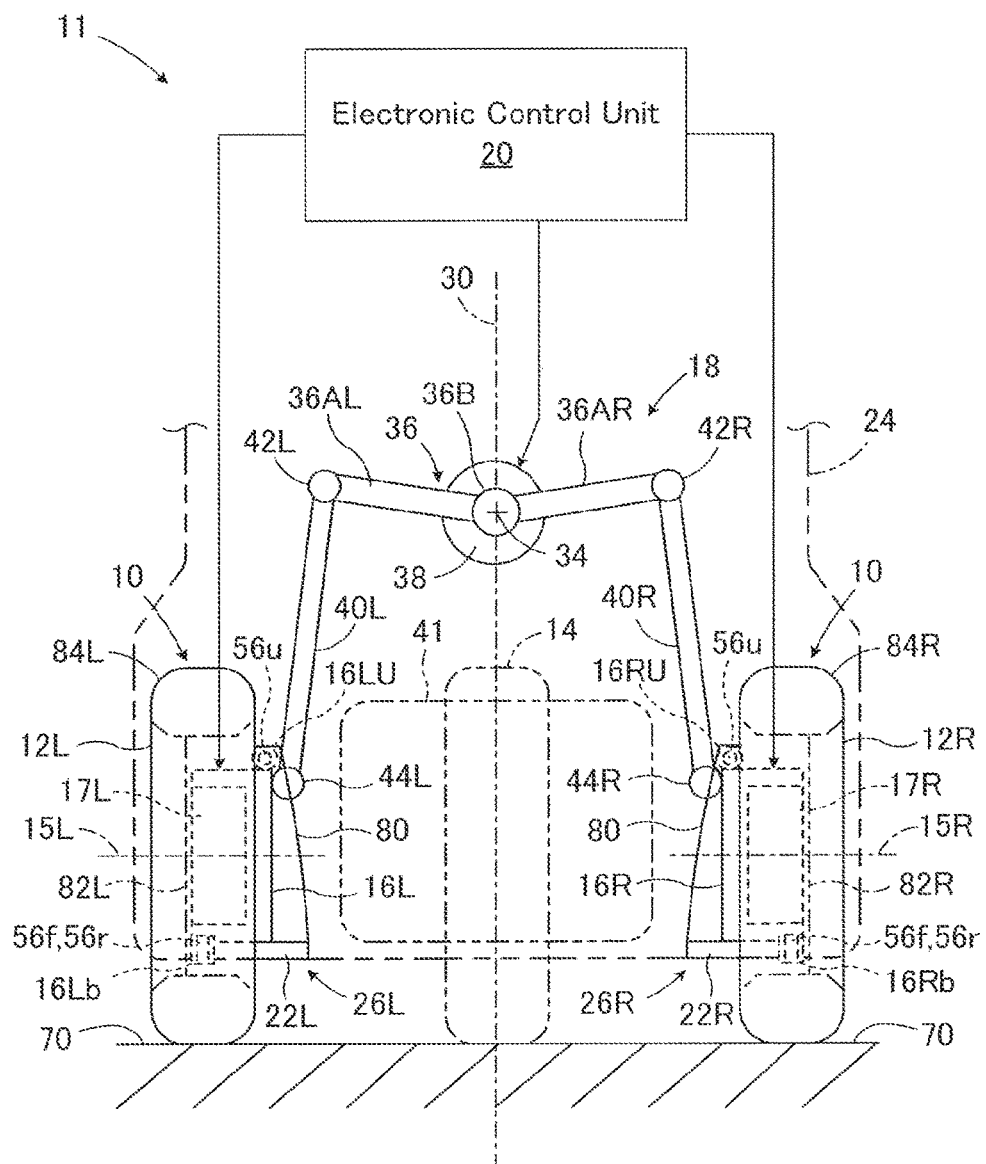
FIG. 1 is a rear view showing an automatic tilting vehicle to which a first embodiment of a suspension device according to the present disclosure is applied as seen from the rear.
Figure 2:
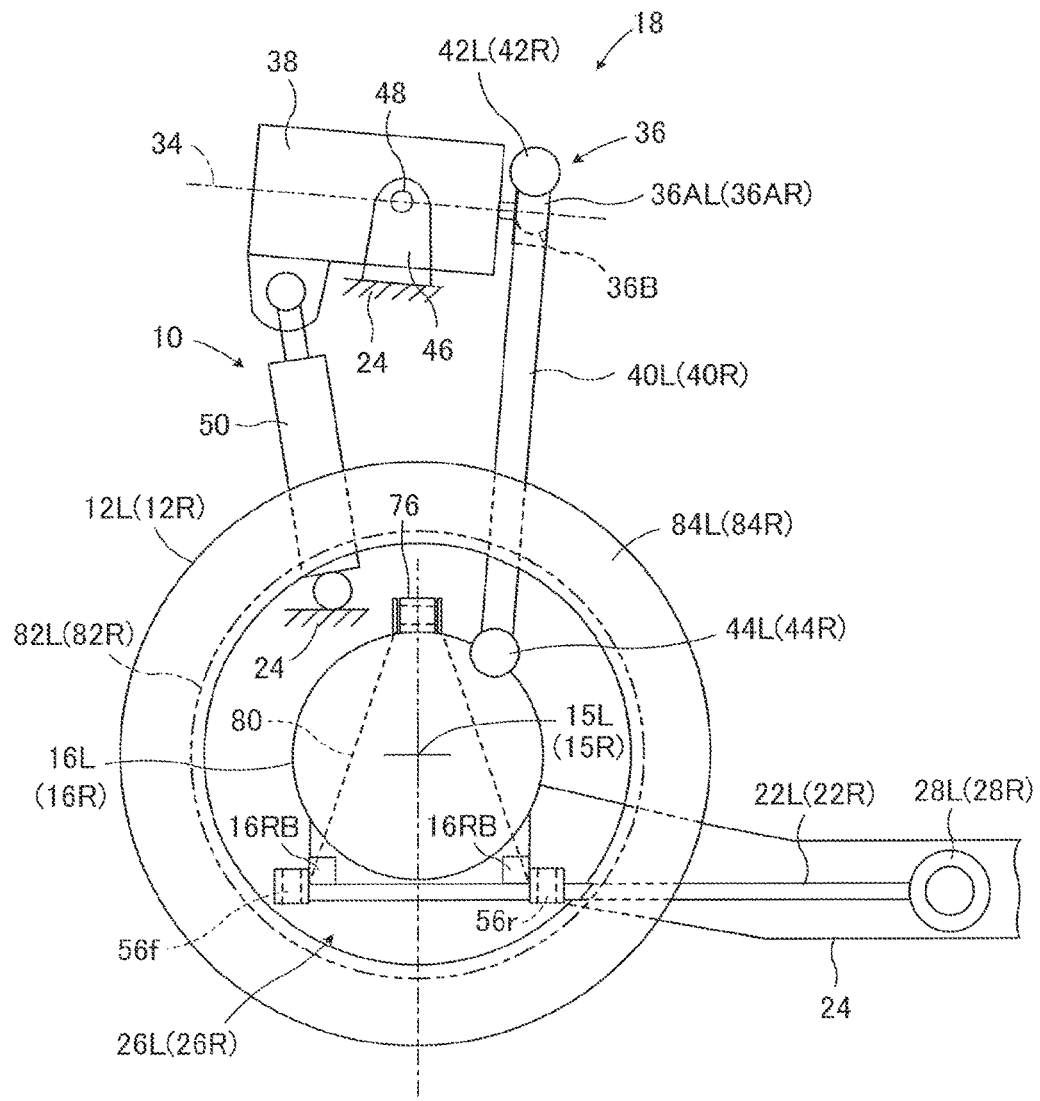
FIG. 2 is a side view showing a automatic tilting vehicle shown in FIG. 1 as seen from the left side of the vehicle.
Figure 3:
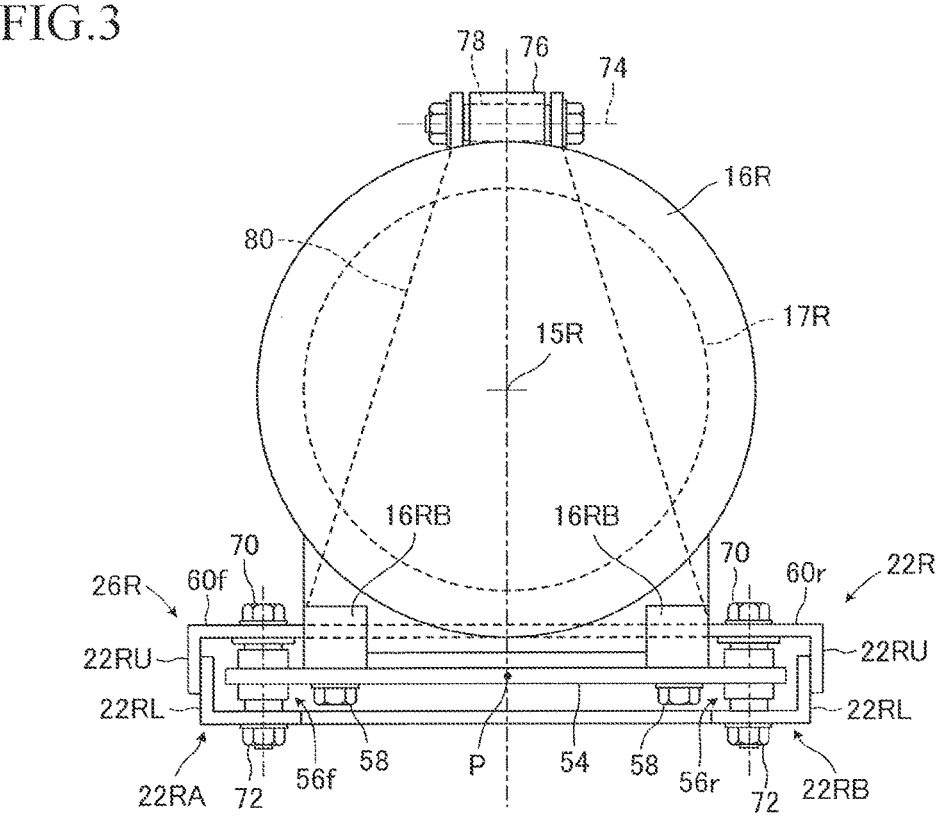
FIG. 3 is a side view showing a connecting structure for connecting a wheel carrier of a front left wheel and a suspension arm in the first embodiment.

In FIGS. 1 to 3, a suspension device 10 according to a first embodiment of the present disclosure is applied to an automatic tilting vehicle 11, and is configured as a leading arm type suspension device. The vehicle 11 is a three-wheeled vehicle including a pair of front wheels 12L and 12R which are non-steered driving wheels, and a single rear wheel 14 which is a steered driven wheel. The front wheels 12L and 12R are spaced apart from each other in the lateral direction and are rotatably supported by corresponding wheel carriers 16L and 16R about rotational axes 15L and 15R, respectively. The automatic tilting vehicle 11 further includes a vehicle tilting device 18 and an electronic control unit 20. It should be noted that the rear wheel 14 may be a steered driving wheel or two wheels having a smaller tread than the front wheels.

The front wheels 12L and 12R are suspended from a vehicle body 24 by the right and left suspension devices 10, respectively. The camber of the front wheels 12L and 12R is a neutral camber, but may be a negative camber or a positive camber. The rear wheel 14 is positioned rearwardly with respect to the front wheels. Although not shown in the figures, the rear wheel 14 is supported by a rear wheel suspension so as to be vertically displaceable with respect to the vehicle body 24 and to restrict lateral displacement and inclination with respect to the vehicle body 24. Further, the rear wheel 14 is steered in a steer-by-wire manner by a steering device being controlled by the electronic control unit 20 in accordance with an operation amount of a steering wheel by a driver.

The wheel carriers 16L and 16R incorporate in-wheel motors 17L and 17R as driving devices, respectively, and each function as a housing of the corresponding in-wheel motor. Rotational direction and an output of the in-wheel motors are controlled by the electronic control unit 20 in accordance with operations of a shift lever and an accelerator pedal (neither shown) by the driver. Braking forces of the front wheels 12L and 12R and the rear wheel 14 are controlled by the electronic control unit 20 controlling a braking device which is not shown in the figures but operates in accordance with an operation of a brake pedal by the driver.

The left and right suspension devices 10 include suspension arms 22L and 22R, respectively. The wheel carriers 16L and 16R are supported by the corresponding suspension arms 22L and 22R so as to be vertically displaceable with respect to the vehicle body 24 and to restrict the lateral displacement and inclination with respect to the vehicle body 24. The illustrated suspension arms 22L and 22R are leading arms that are integrally connected to the wheel carriers 16L and 16R at the front ends by connecting structures 26L and 26R, respectively, and are connected to the vehicle body 24 by joints 28L and 28R at the rear ends.

The joints 28L and 28R may be joints, for example, rubber bushing devices having axes extending substantially in the lateral direction. As long as the above-described requirements regarding the wheel carriers 16L and 16R are satisfied, the suspension arms 22L and 22R may be other arms such as trailing arms or combinations of an upper arm and a lower arm. The configuration of the connecting structures 26L and 26R will be described later in detail.

The vehicle tilting device 18 includes a swing member 36 that swings about a swing axis 34 extending in the front-rear direction and slightly inclined rearward, an actuator 38 that swings the tilting member 36 about the swing axis 34, and a pair of connecting rods 40L and 40R. In FIG. 1, for convenience of explanation, the electronic control unit 20 is illustrated above the vehicle tilting device 18, but it may be housed in an internal structure 41 provided between the front wheels 12L and 12R.

The connecting rods 40L and 40R extend substantially in the vertical direction on both sides transversely to the swing axis 34 and are pivotally connected at the upper ends to the corresponding outer ends of the swing member 36 by joints 42L and 42R. The joints 42L and 42R are preferably joints including a pivot pin with a rubber bush having an axis substantially extending in the longitudinal direction of the vehicle, but may be joints such as ball joints. The illustrated connecting rods 40L and 40R are straight, but may be at least partially curved.

Further, the connecting rods 40L and 40R are pivotally connected at the lower ends to the wheel carriers 16L and 16R by joints 44L and 44R, respectively such as ball joints. A lateral distance between the centers of the joints 44L and 44R is greater than a lateral distance between the centers of the joints 42L and 42R. Note that when a pair of vertical arms extending in the vertical direction are provided and lower ends of the vertical arms are fixed to the corresponding suspension arms 22L and 22R, the connecting rods 40L and 40R may be pivotally connected to upper ends of the corresponding vertical arms. In that case, the lower ends of the connecting rods 40L. 40R are connected to the wheel carriers 16L, 16R via the corresponding vertical arms and the suspension arms 22L, 22R.

The swing member 36 has a boss portion 36B rotatable about the swing axis 34 and arm portions 36AL and 36AR integrally formed with the boss portion 36B and extending in opposite directions from the boss portion 36B, and functions as a swing arm member capable of swinging about the swing axis 34. The effective lengths of the arm portions 36AL and 36AR, that is, a distance between the axis 34 and the center of the joint 42L and a distance between the axis 34 and the center of the joint 42R are the same.

The tilt actuator 38 may be a rotary electric actuator such as a harmonic drive (registered trade mark) including an electric motor such as a DC brushless motor and a reduction gear, both not shown in the figure. An output rotary shaft of the actuator 38 protrudes rearward and the boss portion 36B is fixedly attached to the tip of the output rotary shaft so that the rotary motion of the electric motor is transmitted as a swing motion to the swing member 36. The actuator 38 may be a reciprocating type or a swing type actuator. In the former case, a reciprocating motion of the actuator is converted into a swing motion by a motion converting mechanism and is transmitted to the swing member 36.

As shown in FIG. 2, the actuator 38 is arranged between a pair of brackets 46 laterally spaced and fixed to the vehicle body 24. The actuator 38 has a pair of pivot shafts 48 protruding laterally away from each other and is pivotally supported about the pivot shafts 48 as the shafts 48 are rotatably supported by the brackets 46. A suspension spring 50 and a shock absorber (not shown) are interposed between a front end portion of the actuator 38 and the vehicle body 24 below the front end portion. Therefore, the actuator 38 is connected to the vehicle body via the suspension spring 50 and the shock absorber, not shown, so that the actuator 38 can be displaced in the vertical direction with respect to the vehicle body 24 and the displacement and inclination in the lateral direction with respect to the vehicle body are restricted but the actuator can vertically displaceable with respect to the vehicle body 24 at the front end and rear end portions. It should be noted that the suspension spring 50 may be an elastic member such as a compression coil spring.

The front wheels 12L, 12R and the vehicle tilting device 18 are supported from the vehicle body 24 by the suspension device 10 so that they are capable of relatively displacing in the vertical direction with respect to the vehicle body 24, but lateral displacement and inclination with respect to the vehicle body are restricted. Relative vertical vibration between the front wheels 12L and 12R and the vehicle body 24 generated when the vehicle travels is damped by the shock absorber 50 and the impact of the front wheels 12L and 12R received from a road surface and transmitted to the vehicle body 24 is attenuated by a suspension spring, not shown in the figures.

Although not shown in the figures, when the swing member 36 swings about the swing axis 34, the connecting rods 40L and 40R move up and down in opposite directions, whereby the front wheels 12L and 12R move up and down in opposite directions with respect to the vehicle body 24, which tilts the vehicle 11 in the lateral direction. In particular, the swing member 36 swings so that the connecting rod on the turning inner side rises and the connecting rod on the turning outer side moves downward, whereby the vehicle 11 is inclined toward the inner side of the turning.

A tilt angle of the vehicle 11 is controlled by the actuator 38 of the vehicle tilting device 18 being controlled by the electronic control unit 20. The electronic control unit 20 calculates an estimated lateral acceleration of the vehicle based on a steering angle equal to a rotation angle of a steering wheel (not shown) and a vehicle speed, and calculates a target tilt angle of the vehicle 11 based on the estimated lateral acceleration. Further, the electronic control unit 20 calculates a target rotation angle of the electric motor of the actuator 38 based on the target tilt angle, and controls the electric motor so that a rotation angle of the electric motor becomes the target rotation angle. Further, the electronic control unit 20 calculates a target steered angle of the rear wheel 14 based on a steering angle and a vehicle speed, and steers the rear wheels 14 in a steer-by-wire manner by controlling a steering actuator, not shown in the figures, so that the steered angle of the rear wheel becomes the target steered angle.

In particular, in the first embodiment, as shown in FIG. 3, the connecting structure 26R includes a rectangular plate member 54 formed of a metal such as steel and extending in the front-rear direction, and a pair of elastic bushing devices 56f and 56r. The wheel carrier 16R has boss portions 16RB at positions spaced apart from each other in the front-back direction of the lower edge portion thereof, and the plate member 54 is fixed to the boss portions 16RB by two bolts 58 as fastening members having axes extending in the vertical direction. The elastic bushing devices 56f and 56r have axes extending in the vertical direction and are attached in a state of being inserted through the plate member 54 at positions spaced apart from each other in the front-rear direction. The elastic bushing device 56f is located forward of the front bolt 58 and the elastic bushing device 56r is located rearward of the rear bolt 58 so that a distance between the axes of the elastic bushing devices 56f and 56r is larger than a distance between the axes of the two bolts 58.

Figure 5:
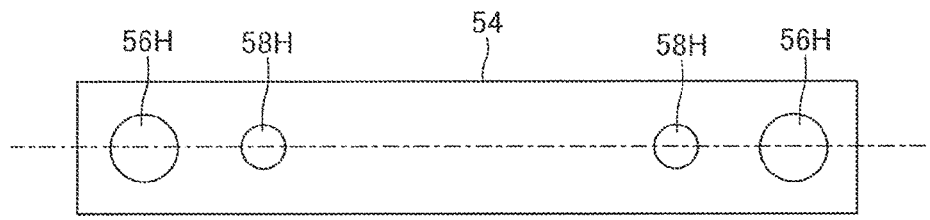
FIG. 5 is a plan view showing a plate member in the first embodiment.

As shown in FIG. 5, the plate member 54 is provided with two holes 56H through which the elastic bushing devices 56f and 56r are inserted and two holes 58H through which the bolts 58 are inserted. These holes 56H and 58H are aligned with each other so as to form a row in the longitudinal direction (front-to-rear direction) of the plate member 54. Thus, the elastic bushing devices 56f and 56r and the two bolts 58 are aligned with each other so as to form a row in the front-rear direction. In order to be able to adjust a mounting position of each plate member with respect to the corresponding wheel carrier, a size of the holes 58H may be set to a value larger than a size for tightly receiving the bolts 58.

Figure 4:
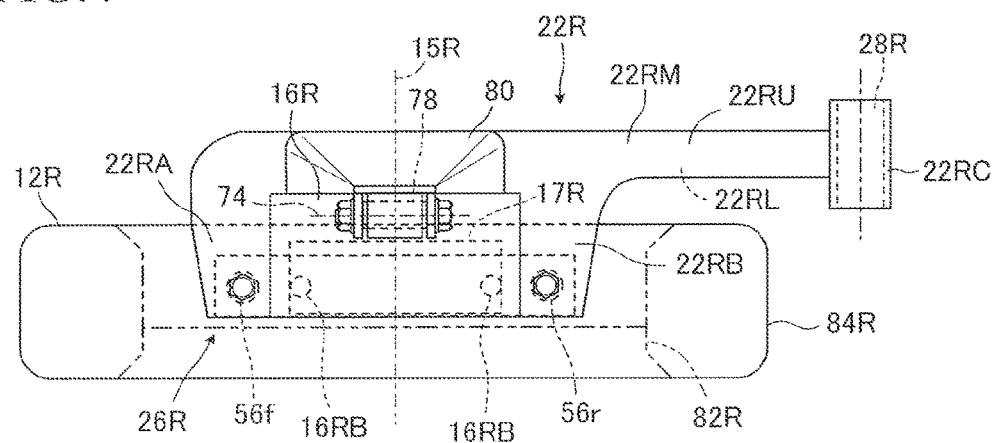
FIG. 4 is a plan view showing the wheel carrier and the suspension arm of the front left wheel in the first embodiment.

As shown in FIG. 4, the suspension arm 22R includes a main body portion 22RM linearly extending in the front-rear direction as viewed from above, and branches 22RA and 22RB protruding laterally outward from the main body at the front end and the intermediate portion of the main body 22RM. As shown in FIGS. 3 and 4, the lower edge portion of the wheel carrier 16R is disposed in a space formed by the main body portion 22RM and the branch portions 22RA and 22RB.

As shown in FIG. 3, the suspension arm 22R includes an upper member 22RU and a lower member 22RL having downward and upward L-shaped cross-sectional shapes, respectively. The upper member 22RU and the lower member 22RL are partially overlapped and welded together at side wall portions, and the distal end portions of the branch portions 22RA and 22RB cooperate with each other to form a staple-shaped cross sectional shape opened so as to face each other along the front-rear direction. Thus, as shown in FIG. 3, the distal end portions of the branch portions 22RA and 22RB form open-sectional portions 60f and 60r for receiving the distal end portions of the plate member 54 and the elastic bushing devices 56f and 56r. A portion of the main body 22RM on the rear side of the branch portion 22RB has a substantially rectangular closed cross sectional shape, not shown, and a cylindrical body 22RC for receiving the joint 28R is integrally fixed to the rear end of the main body portion 22RM.

Figure 6:
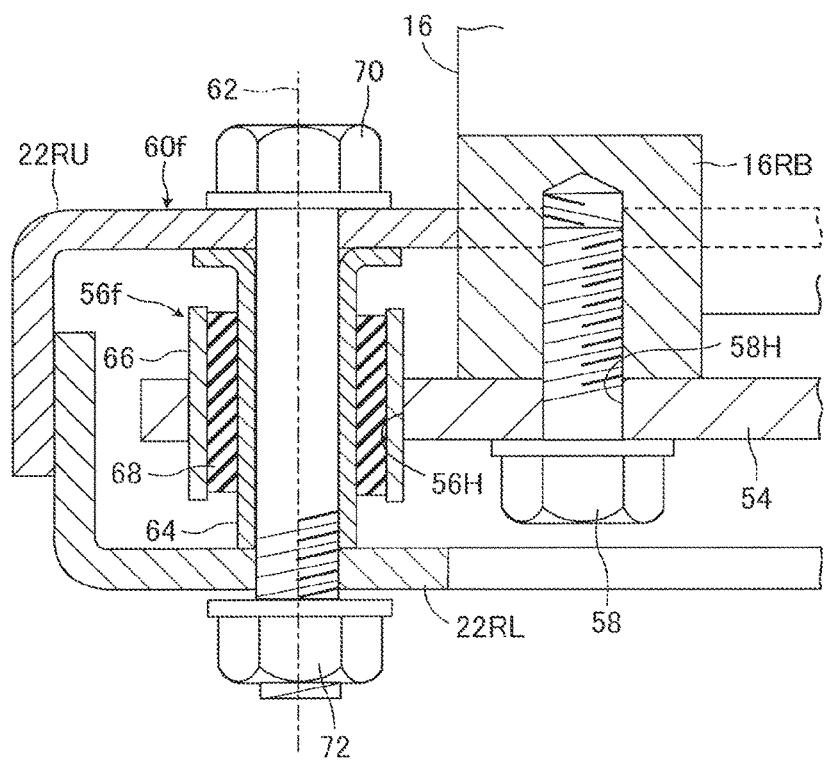
FIG. 6 is an enlarged partial sectional view showing a connecting structure between the wheel carrier and the suspension arm in the first embodiment.

As shown in FIG. 6, the elastic bushing device 56f includes a metal inner cylinder 64 and a metal outer cylinder 66 which are concentric with an axis 62 extending in the vertical direction, and an elastic bushing 68 such as a rubber bush or a resin bush filled between the inner cylinder and the outer cylinder and adhered thereto. In the illustrated embodiment, the inner cylinder 64 is in contact with a lower surface of the portion 60f of the upper member 22RU at a flange portion provided at the upper end, and is in contact with an upper surface of the portion 60f of the lower member 22RL at the lower end. The outer cylinder 66 has a cylindrical shape and is attached to the plate member 54 by press-fitting or welding in a state of being inserted through the hole 56H provided at a tip portion of the plate member 54.

The elastic bushing device 56f is fixed at both ends to an open cross sectional portion 60f by a bolt 70 inserted into the inner cylinder 64 and a nut 72 screwed thereto. Although not shown in the figures, the elastic bushing device 56r is constructed in the same manner as the elastic bushing device 56f except that the relationship in the front-rear direction is opposite, and the elastic hushing device 56r is fixed at both ends to an open cross sectional portion 60r similarly to the elastic bushing device 56f.

As shown in FIG. 3, a boss portion 76 having an axis 74 extending in the front-rear direction is provided at an upper edge portion of the wheel carrier 16R. A cylindrical elastic bushing device 78 similar to the elastic bushing device 56f is disposed in the boss portion 76. A lower edge portion of a side wall member 80 is fixed to the upper member 22RU of the suspension arm 22R by means such as welding. The side wall member 80 has a staple-shaped cross section laterally outwardly opened, and is substantially trapezoidal as viewed in the lateral direction. An upper end portion of the side wall member 80 surrounds the boss portion 76 except for the lateral outer side, and both ends of the elastic bushing device 78 are fixed to the upper end portion of the side wall member 80. As understood from the above description, the elastic bushing device 78, the side wall member 80 and the like also constitute a part of the connecting structure 26R.

Although not shown in the figures, the connecting structure 26L also has the same configuration as the connecting structure 26R except that the relationship in the left-right direction with respect to the center plane 30 of the vehicle 11 is reversed. Therefore, the suspension arms 22L, 22R and the connecting structures 26L, 26R are mirror images of each other as seen in the vertical direction and the front-rear direction of the vehicle 11.

As shown in FIGS. 1 and 4, the front wheels 12L and 12R include metal wheel members 82L and 82R rotatably supported by the wheel carriers 16L and 16R, respectively, and tires 84L and 84R mainly made of rubber and fitted to rim portions of the wheel members. As shown in FIGS. 1 and 2, the wheel carriers 16L, 16R and the connecting structures 26L, 26R are spaced inward from radially inner surfaces of the rim portions so as not to interfere with the rim portions of the corresponding wheel members 82L and 82R.

Second Embodiment

Figure 7:
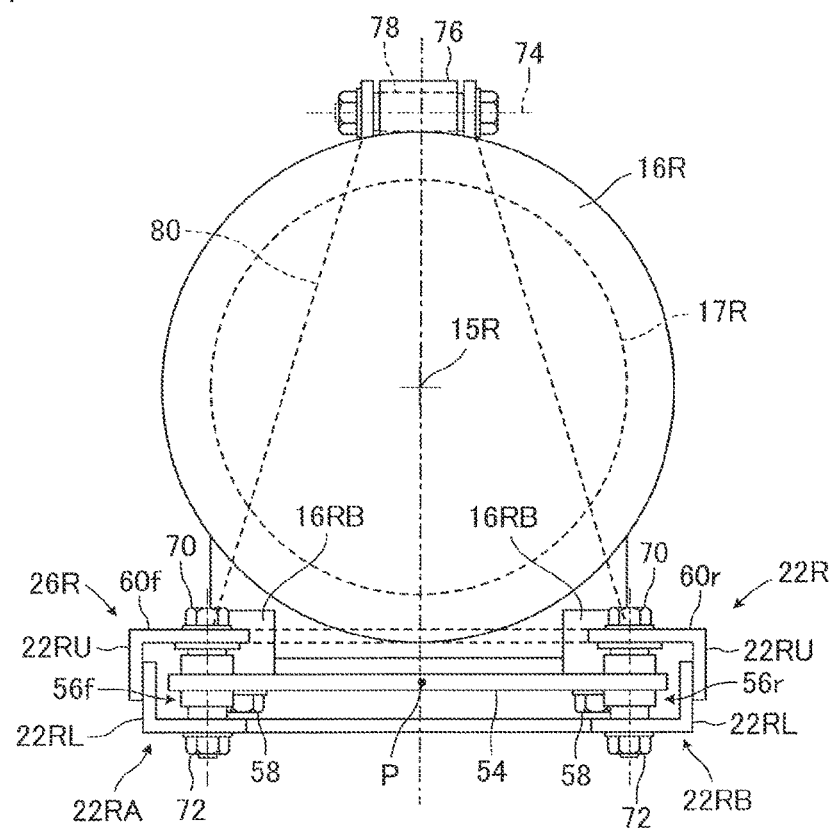
FIG. 7 is a side view showing a connecting structure for connecting a wheel carrier and a suspension arm in a second embodiment of a suspension device according to the present disclosure.
Figure 8:
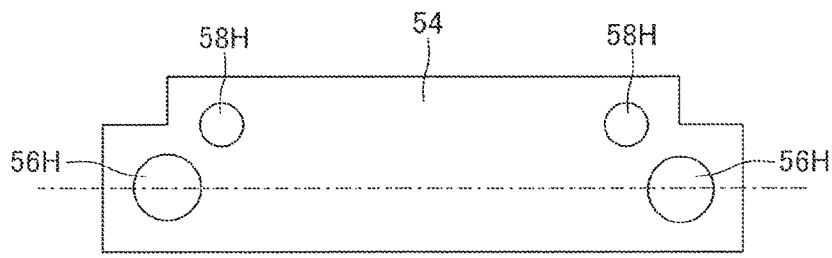
FIG. 8 is a plan view showing a plate member in the second embodiment.

FIG. 7 is a side view showing a connection structure between a wheel carrier and a suspension arm in a second embodiment of a suspension device according to the present disclosure, and FIG. 8 is a plan view showing a plate member in the second embodiment. In FIGS. 7 and 8, the same members as those shown in FIGS. 3 and 5 are denoted by the same reference numerals as those denoted in FIGS. 3 and 5, respectively.

In the second embodiment, the resilient bushing devices 56f and 56r are located laterally outwardly relative to the bolts 58, and the distance between the elastic bushing devices 56f and 56r is smaller than the distance in the first embodiment. Therefore, the holes 56H through which the elastic bushing devices 56f and 56r are inserted and the holes 58H through which the bolts 58 are inserted are offset from each other in the width direction of the plate member, i.e. in the lateral direction of the vehicle. A distance between the two holes 58H is the same as a distance in the first embodiment, but the distance between the two holes 56H is smaller than the distance in the first embodiment. Furthermore, a width of the plate member 54 is larger than a width in the first embodiment, but the length of the plate member 54 is smaller than the length in the first embodiment. The other points of the second embodiment are the same as those of the first embodiment.

Third Embodiment

Figure 9:
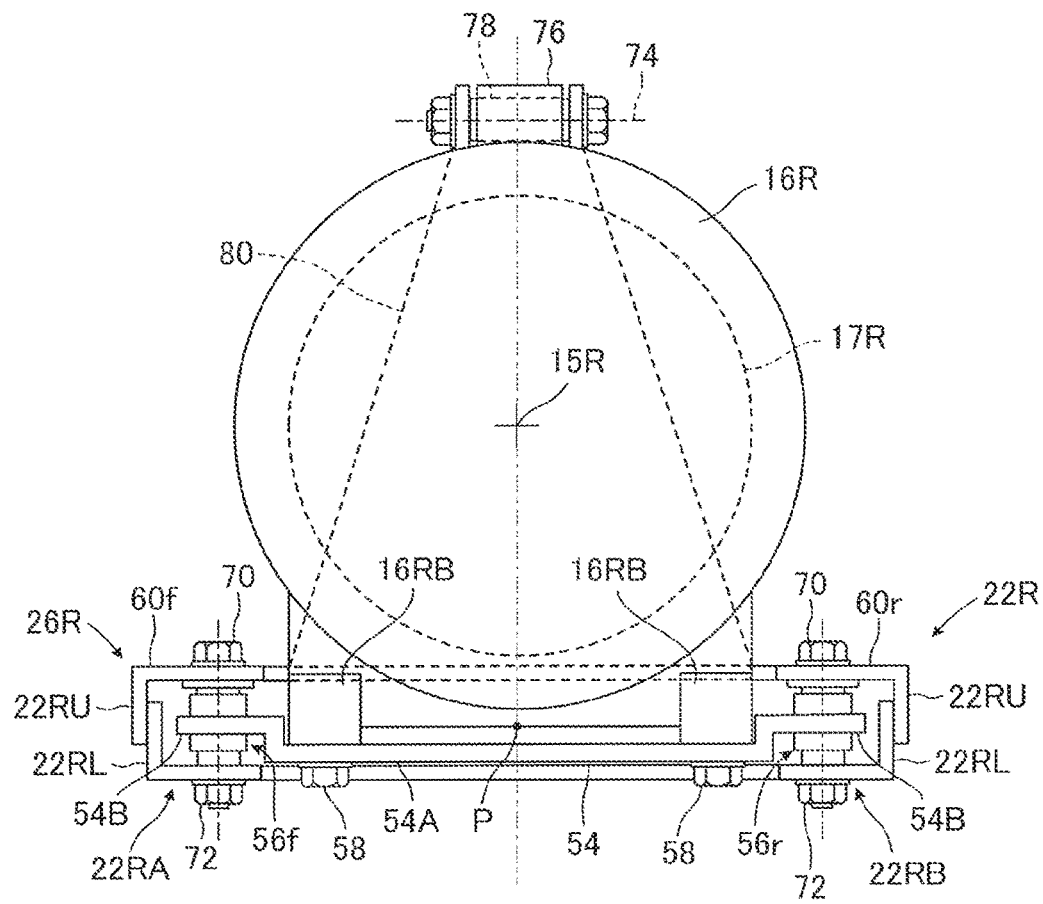
FIG. 9 is a side view showing a connecting structure for connecting a wheel carrier and a suspension arm in a third embodiment of the suspension device according to the present disclosure.

FIG. 9 is a side view showing a connecting structure between the wheel carrier and the suspension arm in the third embodiment of the suspension device according to the present disclosure configured as a modification of the first embodiment. In FIG. 9, the same members as those shown in FIG. 3 are denoted by the same reference numerals as those denoted in FIG. 3.

In the third embodiment, the plate member 54 is not flat like the first and second embodiments, but has a stepped shape. As shown in FIG. 9, a central portion 54A attached to the boss portions 16RB by the bolts 58 and end portions 54B, 54C to which the elastic bushing devices 56f, 56r are attached each have a flat plate shape. However, the end portions 54B and 540 are offset upwardly with respect to the central portion 54A, extend along a plane parallel to the central portion 54A, and cooperate with the central portion 54A to form a stepped shape. Therefore, the positions of the elastic bushing devices 56f and 56r with respect to the boss portions 16RB are higher than the positions in the first and second embodiments. The other points of the third embodiment are the same as those of the first embodiment.

[Operational Effects Common to all Embodiments]

As understood from the above explanations, according to the above-described embodiments, the connecting structures 26L and 26R connecting the suspension arms 22L and 22R to the wheel carriers 16L and 16R, respectively, each include the plate member 54 and the elastic bushing devices 56f and 56r. The plate members 54 are fastened and fixed to the wheel carriers 16L and 16R at positions spaced in the front-rear direction of the vehicle 11, and the elastic bushing devices 56f and 56r are attached in a state of being inserted through the end portions of the plate members. Furthermore, the suspension arms 22L and 22R have the open cross sectional portions 60f and 60r for receiving the ends of the plate members 54 and the elastic bushing devices 56f and 56r, and each elastic bushing device is fixed at the both ends to the open cross sectional portion.

In the case where recesses for arranging elastic members such as dampers are provided on a wheel carrier like the suspension device described in the above-mentioned Japanese Patent Application Laid-open publication, it is necessary to form recesses with high precision by machining or the like in a large and heavy wheel carrier. Also in a suspension device in which elastic bushing devices are directly attached to a wheel carrier, it is as well necessary to form holes for receiving the elastic bushing devices in the wheel carrier with high accuracy by machining or the like.

On the other hand, according to the above-described embodiments, it is only necessary to form bolt holes for fastening and fixing the plate members 54 to the wheel carriers 16L and 16R. When the plate member is attached to the wheel carrier by the bolts 58, an attachment position of the plate member to the wheel carrier can be adjusted. Therefore, as compared with the conventional suspension device, it is possible to lower the machining accuracy of the holes necessary for connecting the suspension arms 22L and 22R to the wheel carriers 16L and 16R and to easily and efficiently machine the holes.

Notably, if elastic bushing devices 56f and 56r are attached to a plate member 54 in advance, these members can be handled as one member. By fixing the plate member 54 to each of the wheel carriers 16L and 16R, the plate member and the pair of elastic bushing devices can be attached to the wheel carrier at the same time. Therefore, a work of connecting the wheel carriers 16L and 16R and the suspension arms 22L and 22R respectively does not become excessively complicated.

Further, according to the above-described embodiments, as described above, the elastic bushing devices 56f and 56r are received in the open cross sectional portions 60f and 60r, and the elastic bushing devices are fixed to the open cross sectional portions at both ends. Therefore, as compared with the structure in which the elastic bushing devices are attached to a plate member in a cantilever state, it is possible to secure the required rigidity even if a thickness of the plate member is small, and the thickness and weight of the plate member can be reduced.

In particular, as compared with a structure in which the elastic bushing devices are positioned below the plate member and are attached to the plate member in a cantilever state, it is possible to reduce the total vertical dimension of the wheel carriers and the suspension arms 22L and 22R at the end portions on the front end sides of the suspension arms. Therefore, without unnecessary miniaturization of the in-wheel motors 17L and 17R, in other words, without sacrificing driving forces of the front wheels 121 and 12R, the wheel carriers and the end portions of the suspension arms can be arranged inside the rim portions of the wheel members 82L and 82R. Furthermore, it is possible to reduce the distances L (not shown) between the rotational axes 15L and 15R of the front wheels 12L and 12R and the cross sectional centers P of the ends on the front end side of the suspension arms as seen in the lateral direction of the vehicle. Therefore, it is possible to reduce a bending moment acting on each suspension arm due to a longitudinal force acting between the wheel carrier and the suspension arm.

The wheel carriers 16L and 16R that accommodate the in-wheel motors 17L and 17R have substantially cylindrical or frusto-conical shapes having axes aligned with the axes of rotation 15L and 15R, respectively. In the case of a structure in which the elastic bushing devices are positioned above the plate member and are attached to the plate member in a cantilever state, in order to prevent the elastic bushing devices 56f and 56r from interfering with the wheel carrier, the distance W (not shown) in the front-rear direction between the axes of the two elastic bushing devices must be enlarged. On the other hand, according to the embodiments described above, since the distance W can be reduced, it is also possible to easily arrange the wheel carrier and the end portion of the suspension arm inside the wheel member.

Furthermore, a large suspension arm is generally formed by integrally joining two press molded products into one hollow member. According to the embodiments described above, when a suspension arm is a hollow member of this type, by not joining the two press molded products in the regions for supporting the elastic bushing devices, open cross sectional portions 60f and 60r can be easily and inexpensively formed.

[Operational Effects Inherent to Each Embodiment]

In particular, according to the first embodiment, the two bolts 58 and the elastic bushing devices 56f and 56r for attaching the plate member 54 to the wheel carrier are aligned with each other so as to form a row in the front-rear direction. Therefore, as compared with a case where the elastic bushing devices 56f and 56r are laterally offset with respect to the two bolts 56 as in the second embodiment, for example, it is possible to efficiently transmit a longitudinal force between the wheel carrier and the suspension arm. Accordingly, in a situation where a longitudinal force acts between the wheel carrier and the suspension arm, it is possible to reduce a moment acting on the suspension arm and the plate member as viewed from above.

According to the second embodiment, since the elastic bushing devices 56f and 56r are offset in the lateral direction with respect to the two bolts 58, the distance between the elastic bushing devices 56f and 56r can be made smaller than that in the first embodiment. Therefore, it is possible to reduce the size in the front-rear direction of the end portions of the suspension arms 22L and 22R disposed inside the wheel members 82L and 82R, respectively so that the ends of the suspension arms and the wheel carriers can be easily arranged inside the wheel members.

According to the third embodiment, the end portions 54B and 54O of the plate member 54 are offset upward with respect to the central portion 54A attached to the boss portions 16RB by the bolts 58, are arranged along a plane parallel to the central portion 54A, and cooperates with the central portion 54A to form a stepped shape. Therefore, since the positions of the elastic bushing devices 56f and 56r with respect to the boss portions 16RB are higher than the positions in the first and second embodiments, the distance between the rotational axes 15L and 15R of the front wheels 12L and 12R and the cross sectional centers P of the ends on the front end side of the suspension arms can be reduced. Accordingly, a bending moment acting on each suspension arm as seen in the lateral direction due to a longitudinal force acting between the wheel carrier and the suspension arm can be reduced as compared with the first and second embodiments.

Furthermore, according to the third embodiment, the heights of the front end side portions of the suspension arms 22L and 22R can be set by setting upward offset amounts of the end portions 54B and 540 with respect to the central portion 54A. Therefore, a degree of freedom in setting heights of the front end side portions of the suspension arms 22L and 22R with respect to the wheel carriers 16L and 16R can be increased.

Although the present disclosure has been described in detail with reference to specific embodiments, it will be apparent to those skilled in the art that the present disclosure is not limited to the above-described embodiments, and various other embodiments are possible within the scope of the present disclosure.

For example, in the embodiments described above, the sectional shapes of the open cross sectional portions 60f and 60r of the suspension arms 22L and 22R are staple-shaped. However, the cross sectional shape of the open cross sectional portions may be another cross-sectional shape such as a U-shape as long as they have open cross sectional shapes that receive the tip ends of the plate member 54 and the elastic bushing devices 56f and 56r.

In the above-described embodiments, the open cross sectional portions 60f and 60r have a staple-shaped cross sectional shape opened so as to face each other along the front-rear direction. However, the open cross sectional portions may have cross sectional shapes opened forward or rearward, or may have open cross sectional shapes which are opposite to those in the embodiments.

Further, in the above-described embodiments, the suspension arms 22L and 22R are formed by welding the upper member 22RU and the lower member 22RL which are L-shaped in a downward and upward direction, respectively, partially overlapped and welded at the side wall portions. However, the suspension arm may be a solid member integrally formed with an open cross sectional portion, or may be a member in which a member having an open cross section is integrally connected to a solid arm body member by welding or the like.

In the above-described embodiments, the distance between the axes of the elastic bushing devices 56f and 56r is larger than the distance between the axes of the two bolts 58. However, the distance between the axes of the elastic bushing devices 56f and 56r may be equal to or less than the distance between the axes of the two bolts 58.

In the above-described embodiments, the suspension device 10 is applied to the automatic tilting vehicle 11 having the vehicle tilting device 18, and the vehicle tilting device 18 swings the swing member 36 so that the connecting rods 40L and 40R move up and down in opposite phases to tilt the vehicle. However, the suspension device 10 may be applied to an automatic tilting vehicle having a vehicle tilting device of an arbitrary structure, and furthermore, it may be configured as a suspension device for non-steered driving wheels of a vehicle other than the automatic tilting vehicle as long as an in-wheel motor is incorporated in a wheel.

Furthermore, in the above-described third embodiment, the end portions 54B and 540 are offset upward with respect to the central portion 54A. However, the end portions 54B and 54C may be offset downwardly with respect to the central portion 54A. In that case, the positions of the elastic bushing devices 56*f* and 56*r* with respect to the boss portions 16RB are lower than the positions in the first and second embodiments.

What is claimed is:

1. A suspension device for a non-steered driving wheel which is rotationally driven by an in-wheel motor incorporated in a wheel carrier, the suspension device comprising a suspension arm pivotally supported on a vehicle body of a vehicle and connected to the wheel carrier by a connecting structure, wherein
   the connecting structure includes a plate member fixed to the wheel carrier by fastening at positions spaced in a front-rear direction of a vehicle, and a pair of elastic bushing devices attached to the plate member in a state of being inserted through the plate member at positions spaced in the front-rear direction of the vehicle;
   the suspension arm has open cross sectional portions which each receive a portion of the plate member and the elastic bushing device; and
   the elastic bushing devices are fixed to the open cross sectional portions at both ends, and
   wherein the plate member is fixed to the wheel carrier by a pair of fastening members, and the pair of fastening members are positioned between the pair of elastic bushing devices and are aligned with the pair of elastic bushing devices in the front-rear direction of the vehicle.

2. The suspension device for a non-steered driving wheel according to claim 1, wherein the vehicle includes a pair of the non-steered driving wheels spaced laterally and a vehicle tilting device configured to tilt the vehicle to a turning inner side when the vehicle turns, and the vehicle tilting device includes a swing member that swings about a swing axis extending in the front-rear direction, an actuator that swings the swing member about the swing axis, and a pair of connecting rods pivotally connected to the swing member at upper end pivot points and pivotally connected to the corresponding wheel carriers at lower end pivot points on both lateral sides with respect to the swing axis.

3. A suspension device for a non-steered driving wheel which is rotationally driven by an in-wheel motor incorporated in a wheel carrier, the suspension device comprising a suspension arm pivotally supported on a vehicle body of a vehicle and connected to the wheel carrier by a connecting structure, wherein
   the connecting structure chides a plate member fixed to the wheel carrier by fastening at positions spaced in a front-rear direction of a vehicle, and a pair of elastic bushing devices attached to the plate member in a state of being inserted through the plate member at positions spaced in the front-rear direction of the vehicle;
   the suspension arm has open cross sectional portions which each receive a portion of the plate member and the elastic bushing device; and
   the elastic bushing devices are fixed to the open cross sectional portions at both ends, and
   the vehicle includes a pair of the non-steered driving wheels spaced laterally and a vehicle tilting device configured to tilt the vehicle to a turning inner side when the vehicle turns, and the vehicle tilting device includes a swing member that swings about a swing axis extending in the front-rear direction, an actuator that swings the swing member about the swing axis, and a pair of connecting rods pivotally connected to the swing member at upper end pivot points and pivotally connected to the corresponding wheel carriers at lower end pivot points on both lateral sides with respect to the swing axis.

4. The suspension device for a non-steered driving wheel according to claim 3, wherein the plate r ember is fixed to the wheel carrier by a pair of fastening members, and the pair of fastening members are positioned between the pair of elastic bushing devices and are aligned with the pair of elastic bushing devices in the front-rear direction of the vehicle.

5. The suspension device for a non-steered driving wheel according to claim 3, wherein the plate member is fixed to the wheel carrier by a pair of fastening members, and the pair of fastening members are offset in the lateral direction of the vehicle with respect to the pair of elastic bushing devices.

6. The suspension device for a non-steered driving wheel according to claim 3, wherein the plate member has a central portion fixed to the wheel carrier by a pair of fastening members and two end portions to which the elastic bushing devices are attached, and the two end portions are vertically offset with respect to the central portion.

* * * * *